US012147541B2

(12) United States Patent
Feng et al.

(10) Patent No.: US 12,147,541 B2
(45) Date of Patent: Nov. 19, 2024

(54) SECURE BOOT UP OF COMPUTING DEVICES

(71) Applicant: Hewlett-Packard Development Company, L.P., Spring, TX (US)

(72) Inventors: Kang-Ning Feng, Taipei (TW); Tsue-Yi Huang, Taipei (TW); Chin-Hung Chao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 210 days.

(21) Appl. No.: 18/000,327

(22) PCT Filed: Jun. 8, 2020

(86) PCT No.: PCT/US2020/036689
§ 371 (c)(1),
(2) Date: Nov. 30, 2022

(87) PCT Pub. No.: WO2021/251950
PCT Pub. Date: Dec. 16, 2021

(65) Prior Publication Data
US 2023/0334156 A1 Oct. 19, 2023

(51) Int. Cl.
*G06F 21/57* (2013.01)
*G06F 12/0875* (2016.01)
*G06F 21/54* (2013.01)
*G06F 21/64* (2013.01)

(52) U.S. Cl.
CPC ........ *G06F 21/575* (2013.01); *G06F 12/0875* (2013.01); *G06F 21/54* (2013.01); *G06F 21/64* (2013.01); *G06F 2221/034* (2013.01)

(58) Field of Classification Search
CPC ........ G06F 21/575; G06F 21/54; G06F 21/64; G06F 2221/034; G06F 12/0875
See application file for complete search history.

(56) References Cited

U.S. PATENT DOCUMENTS

| 9,021,244 | B2 * | 4/2015 | Bobzin | G06F 21/575 |
| | | | | 713/1 |
| 9,336,395 | B2 | 5/2016 | Berlin | |
| 9,785,801 | B2 * | 10/2017 | Zimmer | G06F 21/575 |
| 9,870,474 | B2 | 1/2018 | Bobzin et al. | |
| 2014/0215196 | A1 * | 7/2014 | Berlin | G06F 21/575 |
| | | | | 713/2 |

(Continued)

FOREIGN PATENT DOCUMENTS

TW 202011214 A 3/2020

*Primary Examiner* — Richard G Keehn
(74) *Attorney, Agent, or Firm* — Quarles & Brady LLP

(57) ABSTRACT

Techniques for secure boot up of unified extensible firmware interface (UEFI) compliant devices are described. In an example, execution of a driver associated with a hardware component of a computing device may be detected during booting of the computing device. Based on the detection, a first driver hash of a system table of the UEFI may be computed, where the system table is a data structure that stores configuration details of the computing device and UEFI services. Thereafter, a second driver hash of the system table may be computed based on detection of completion of the execution of the driver. The first driver hash and the second driver hash may then be compared to determine tampering with the system table of the UEFI.

15 Claims, 5 Drawing Sheets

(56) References Cited

U.S. PATENT DOCUMENTS

| | | | | |
|---|---|---|---|---|
| 2014/0304520 A1* | 10/2014 | Bobzin | G06F 21/572 | 713/187 |
| 2015/0193620 A1* | 7/2015 | Khatri | G06F 21/575 | 713/2 |
| 2016/0070913 A1* | 3/2016 | Kulkarni | G06F 21/575 | 713/2 |
| 2016/0180094 A1* | 6/2016 | Dasar | G06F 21/575 | 714/36 |
| 2016/0378970 A1* | 12/2016 | Campbell | G06F 21/575 | 726/17 |
| 2017/0085383 A1* | 3/2017 | Rao | G06F 21/575 | |
| 2017/0235683 A1* | 8/2017 | Iijima | G06F 21/575 | 711/163 |
| 2018/0095679 A1* | 4/2018 | Wysocki | G06F 3/0689 | |
| 2018/0349604 A1* | 12/2018 | Khatri | G06F 21/572 | |
| 2018/0349607 A1* | 12/2018 | Khatri | G06F 21/575 | |
| 2019/0042754 A1* | 2/2019 | Jreij | G06F 21/575 | |
| 2019/0163911 A1* | 5/2019 | Kliewer | G06F 21/575 | |
| 2020/0250348 A1* | 8/2020 | Hamlin | G06F 21/34 | |
| 2021/0232691 A1* | 7/2021 | Bishop | G06F 21/575 | |

* cited by examiner

SECURE BOOT UP OF COMPUTING DEVICES

BACKGROUND

Computing devices include multiple hardware components that entail configuration before operation. Modern system firmware, such as Unified Extensible Firmware Interface (UEFI) allows execution of drivers associated with such hardware components during boot up of a computing device. Such execution of drivers facilitates the hardware components to be configured and initialized during the computing device boot up.

BRIEF DESCRIPTION OF DRAWINGS

The detailed description is provided with reference to the accompanying figures, wherein.

DETAILED DESCRIPTION

Figure 1:
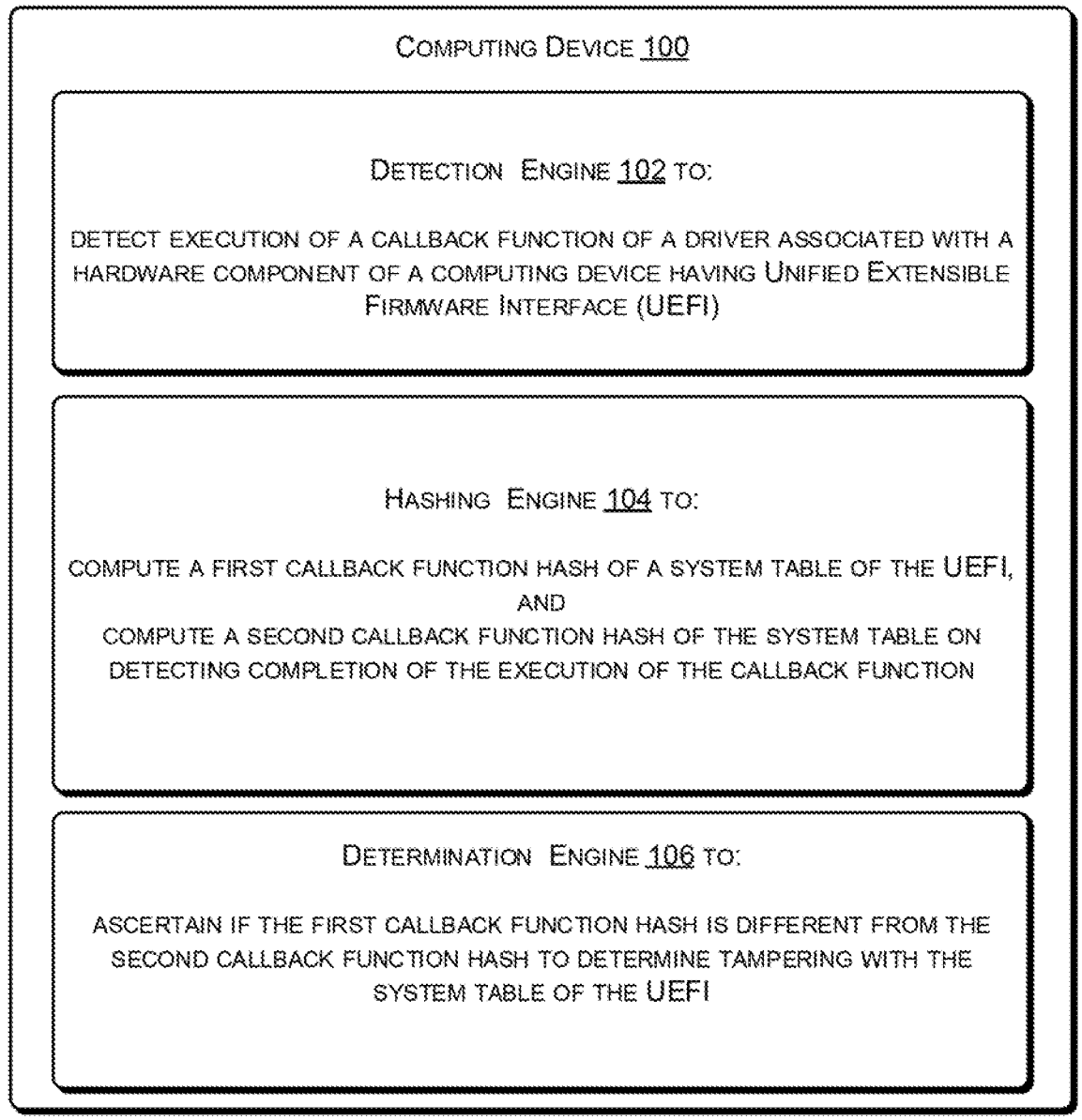
FIG. 1 illustrates a computing device for determining tampering with the Unified Extensible Firmware Interface (UEFI), in accordance with an example of the present subject matter.

Generally, the Unified Extensible Firmware Interface (UEFI) ensures secure boot up of the computing device by verifying the drivers associated with the various hardware components before execution. The verification of a driver is performed by validating a digital signature associated with the driver, where the digital signature is linked with the driver during its development and is indicative of the authenticity of the driver.

The driver associated with a hardware component is generally available in binary format without any source code associated therewith, where the binary format of the driver is verifiable by the digital signature accompanying the driver. Thus, if the source code of the driver is tampered with, for example, by a malicious code during development of the driver, and is thereafter digitally signed, integrity of the driver may not be ascertained. Accordingly, the malicious code of the driver may compromise security of the UEFI along with user data stored on the computing device.

According to example implementations of the present subject matter, techniques for secure boot up of a UEFI compliant computing device are described.

In operation, while booting up a computing device, execution of a driver for configuration of a hardware component of the computing device is detected. Based on the detection, a first hash of a system table of the UEFI is computed, where the system table is a data structure that stores configuration details of the computing device and various UEFI services. The driver is then allowed to be executed for configuration of the hardware component for operation. Once the configuration of the hardware component is completed, a second hash of the system table is computed and compared with the first hash. It is then determined whether the first hash and the second hash are equal.

If the first hash and the second hash are unequal, it may be determined that the system table has been tampered with. Accordingly, a notification indicating tampering with the system table may be issued. In such a situation, modifications made to the system table may be rolled back and the driver may be blocked for any further execution. Accordingly, during a subsequent boot up of the computing device, the execution of the driver may be blocked and the computing device may boot up without initializing the hardware component associated with the driver.

On the other hand, if the first hash and the second hash are found to be equal, it may be determined that no modifications have been made to the system table. In such a situation, the computing device may proceed with a normal boot.

The above-mentioned techniques thus ensure the integrity of the contents of the system table of the UEFI by detecting any modifications made thereto, by a driver associated with a hardware component of the computing device. Also, blocking further execution of the driver avoids execution of the malicious code during a subsequent boot up of the computing device, thereby ensuring a secure boot up of the computing device.

The above techniques are further described with reference to FIG. 1 to FIG. 5. It should be noted that the description and the figures merely illustrate the principles of the present subject matter along with examples described herein and should not be construed as a limitation to the present subject matter. It is, thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a computing device 100 for determining tampering with unified extensible firmware interface (UEFI), in accordance with an example of the present subject matter. Examples of the computing device 100 may include, but are not limited to, laptops, desktops, tablets, and smartphones.

The computing device 100 may include multiple hardware components that may be initialized during pre-operating system (OS) initialization of the computing device 100. Further, each of the multiple components may correspondingly have a driver associated therewith, where each of the drivers may correspond to multiple callback functions.

In an illustrative example, a first driver associated with a first hardware component of the computing device 100 may be used to publish data into an Advanced Configuration and Power Interface (ACPI) table, where the ACPI table, in an example, may store hardware configuration information and power management information of the computing device 100. In said example, the data to be published into the ACPI table may become available after execution to a second driver associated with a second hardware component of the computing device 100. In such a situation, the first driver may register a callback function to monitor the availability of the data. As the availability of the data may be determined to be true, an event may be triggered to invoke the callback function of the first driver. Accordingly, the callback function of the first driver may be executed and the data may be published in the ACPI table.

The computing device 100 may include a detection engine 102 to determine execution of a callback function of a driver associated with a hardware component of the computing device 100. The execution of the callback function may be detected in a driver execution environment (DXE) phase during the pre-OS initialization of the computing device 100.

Based on the detection of execution of the callback function, a hashing engine 104 of the computing device 100 may compute a first callback function hash of a system table of the UEFI, where the system table is a data structure that stores configuration details of the computing device and various UEFI services.

The hashing engine 104 may subsequently detect completion of the execution of the callback function. Based on the detection, the hashing engine 104 may compute a second callback function hash of the driver.

A determination engine 106 of the computing device 100 may then compare the first callback function hash with the second callback function hash to ascertain if the system table has been tampered with. Thus, any modifications to the system table made because of the execution of the callback function may be identified, thereby ensuring integrity of the content stored in the system table.

Figure 2:
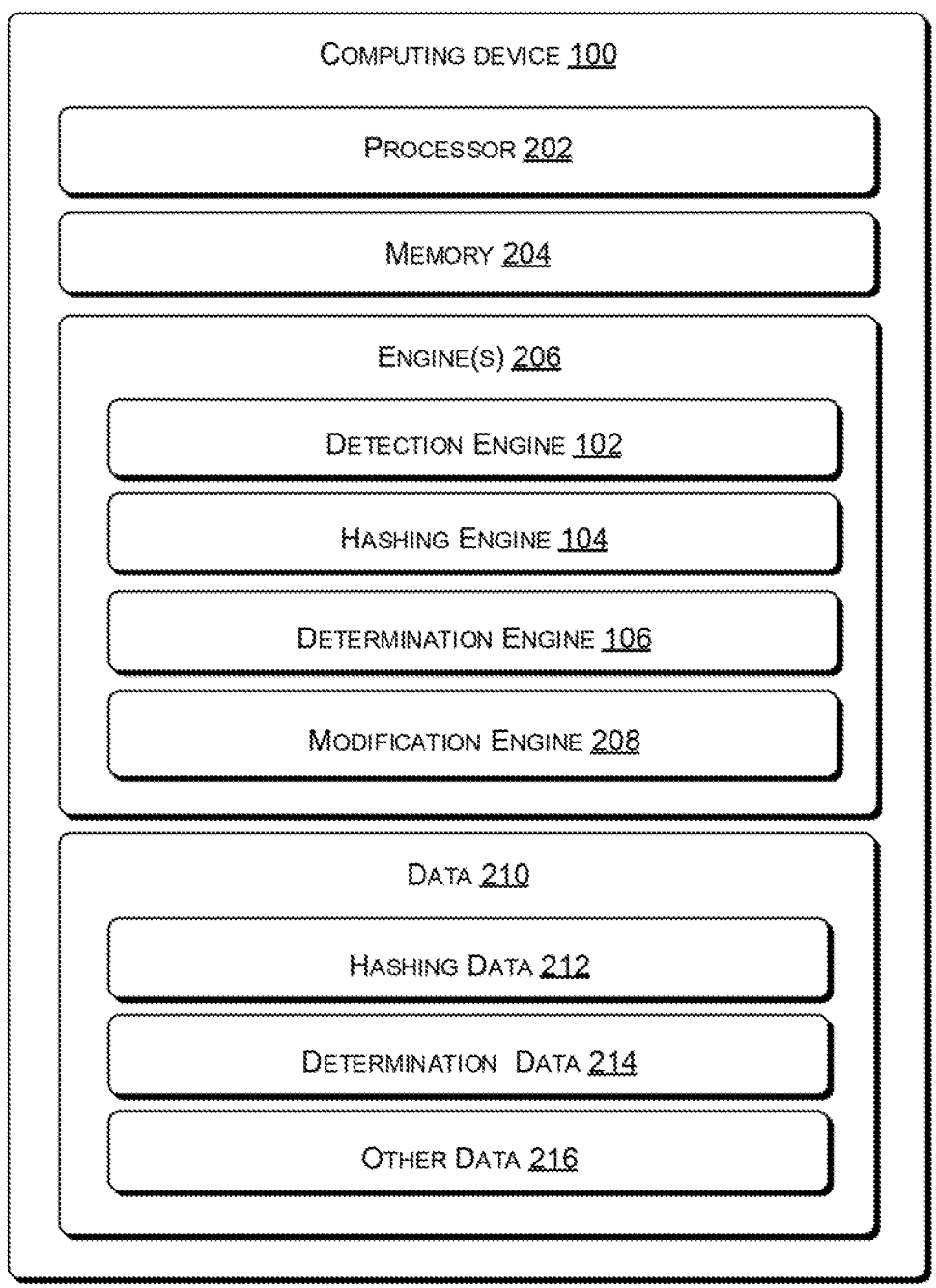
FIG. 2 illustrates a computing device for determining tampering with the UEFI, in accordance with another example of the present subject matter.

FIG. 2 illustrates the computing device 100 for determination of tampering with the UEFI, in accordance with another example of the present subject matter. As described earlier, examples of the computing device 100 may include, but are not limited to, desktops, laptops, smartphones, and tablets.

The computing device 100 may include a processor 202 and a memory 204 coupled to the processor 202. The functions of the various elements shown in the Figures, including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA). Other hardware, standard and/or custom, may also be coupled to processor 202.

The memory 204 may include any computer-readable medium including, for example, volatile memory (e.g., Random Access Memory (RAM)), and/or non-volatile memory (e.g., ROM, EPROM, flash memory, etc.).

Further, the computing device 100 may also include engine(s) 206, which may include the detection engine 102, the hashing engine 104, the determination engine 106, and a modification engine 208.

In an example, the engine(s) 206 may be implemented as a hardware, firmware and a combination thereof. In examples described herein, such combinations of hardware and firmware may be implemented in several different ways. For example, the firmware of the engine may be processor executable instructions stored on a non-transitory machine-readable storage medium and the hardware for the engine may include a processing resource (for example, implemented as either a single processor or a combination of multiple processors), to execute such instructions.

In accordance to implementations of the present subject matter, the machine-readable storage medium may store instructions that, when executed by the processing resource, implement the functionalities of the engine. In such implementations, the computing device 100 may include the machine-readable storage medium for storing the instructions and the processing resource to execute the instructions.

In an example of the present subject matter, machine-readable storage medium may be located within the computing device 100. However, in other examples, the machine-readable storage medium may be located at a different location but accessible to computing device 100 and the processor 202.

The computing device 100 may further include data 210, that serves, amongst other things, as a repository for storing data that may be fetched, processed, received, or generated by the engine(s) 206. The data 210 may include hashing data 212, determination data 214, and other data 216. In an example, the data 210 may be stored in the memory 204.

In an example implementation of the present subject matter, the pre-OS initialization of the computing device having the UEFI is divided into multiple phases, namely, security (SEC) phase, pre-EFI (PEI) phase, driver execution environment (DXE) phase, Boot device selection (BDS) phase, and transient system load (TSL) phase. The pre-OS initialization may begin with the SEC phase, where initial operations may be performed to ensure integrity of the firmware for initialization of the processor, chipset, and mother board after the computing device 100 is powered on or restarted. The pre-OS initialization may then proceed to the PEI phase, where the PEI phase provides a standardized method of loading and invoking specific initial configuration routines for the processor, chipset, and mother board of the computing device 100. The primary purpose of the PEI phase is to determine boot path of the computing device 100 and initializing and allocating a minimum amount of RAM and permanent memory that contain the DXE foundation and architectural protocols to allow instantiation of the DXE phase.

In the DXE phase, initialization of various hardware components of the computing device 100 is performed. The initialization of the various hardware components may be facilitated by execution of different drivers associated with each of the various hardware components. In an example, discovery and execution of the different drivers is facilitated by a DXE dispatcher.

In an example of the present subject matter, the DXE dispatcher may be coupled to the detection engine 102, where the detection engine 102 detects execution of a driver associated with a hardware component of the computing device 100, in the DXE phase. The driver may be one of a DXE driver and a UEFI driver.

Based on the detection of execution of the driver by the detection engine 102, the hashing engine 104 may generate a system management interrupt (SMI), where the generation of the SMI causes triggering of a system management mode (SMM) within the DXE phase. The triggering of the SMM may preserve a state of the processor 202 in a secure region of the RAM designated as System Management RAM (SMRAM).

Further, the hashing engine 104 may compute a first driver hash of the system table of the UEFI based on the detection of execution of the driver and may store the first driver hash in the hashing data 214. As explained earlier, the system table is a data structure that stores configuration details of the computing device and various UEFI services.

The various UEFI services may include UEFI boot services, UEFI runtime services, and protocol services. The UEFI boot services and the UEFI runtime services may be respectively accessed through UEFI boot services table and UEFI runtime services table include included in the system table. Further, the protocol services are group of related functions and data fields that may be used to provide software abstractions for devices, such as consoles, disks, and network.

On execution of the driver, a pointer to the system table may be passed to the driver. Passing the pointer to the driver allows the driver to access the configuration information of the computing device along with the various UEFI services to initialize the hardware component associated therewith.

It would be noted that once the first driver hash of the system table is computed and stored in hashing data 214, the SMM may be terminated and the driver is executed.

Once the execution of the driver is completed, the hashing engine 104 may regenerate the SMI, thereby retriggering the SMM within the DXE phase. Subsequently, the hashing engine 104 may compute a second driver hash of the system table and may store the same in the hashing data 214. In an example, the hashing data 214 may be stored in the SMRAM to prevent access of the first driver hash and the second driver hash outside of the SMM.

The hashing engine 104 may further be coupled to the determination engine 106, where the determination engine 106 may compare the first driver hash and the second driver hash of the system table and store a result of the comparison in the determination data 214. In an example, the determination data 214 may also be stored in the SMRAM.

The first driver hash and the second driver hash may be compared to identify if any modifications have been made to the system table during the execution of the driver.

If the determination engine 106 determines the first driver hash and the second driver hash to be equal, the determination engine 106 may ascertain that no modifications have been made to the system table. Subsequently, it may be determined if the DXE dispatcher has any more drivers to load and execute. If no other drivers are identified for execution, the DXE phase may be concluded and the control may be passed to the subsequent phases for loading the OS.

On the other hand, if the determination engine 106 determines the first driver hash and the second driver hash to be unequal, the determination engine 106 may determine that the execution of the driver has tampered with the system table of the UEFI. In such a situation, the driver may be blocked. Further, in an example, the execution of the driver may be blocked during subsequent boots of the computing device 100.

Subsequently, the modification engine 208 may undo any modifications made to the system table during the execution of the driver.

Once the execution of the driver is completed, the DXE dispatcher may further identify if any more driver associated with any other component of the computing device requires execution.

In an example, the DXE dispatcher may not identify any other driver associated with any other hardware component for execution. In such a situation, a video output device coupled to the computing device may be identified. Subsequently, a notification indicating the tampering with the system table along with the details of the driver may be displayed, followed by rebooting of the computing device.

In another example, the DXE dispatcher may discover and execute a callback function of another driver associated with another hardware component of the computing device 100. In said example, the detection engine 102 coupled to the DXE dispatcher may detect the execution of the callback function.

Based on the detection, the hashing engine 104 may cause the triggering of the SMM. The hashing engine 104 may then compute a first callback function hash of the system table and store the same in hashing data 214. Subsequently, the SMM may be terminated and the execution of the callback function may be completed.

Once the execution of the callback function is complete, the hashing engine 104 may re-trigger the SMM and may compute a second callback function hash of the system table. Thereafter, the second callback function hash may be stored in the hashing data 214.

The determination engine 106 may compare the first callback function hash and the second callback function hash to ascertain if the execution of the callback function has tampered with the system table of the UEFI.

If the determination engine 106 determines the first callback function hash and the second callback function to be equal, the determination engine 106 may determine that no modification have been made to the system table of the UEFI.

On the other hand, if the determination engine 106 determines the first callback function hash and the second callback function hash to be unequal, the determination engine 106 may determine that the execution of the callback function has tampered with the system table. Accordingly, the other driver may be blocked. Subsequently, the modification engine 208 may undo the modifications made to the system table during the execution of the callback function.

The DXE dispatcher may again identify if there remains any other driver associated with any other hardware component for execution. In an example, the DXE dispatcher may not identify any other driver associated with any other hardware component for execution. In such a situation, it may be determined if a video output device is coupled to the computing device 100. If a video output device is not found to be coupled to the computing device 100, a notification indicating an attack on the UEFI may be displayed by blinking a light emitting diode (LED) installed on the computing device 100, followed by reboot of the computing device 100.

Figure 3:
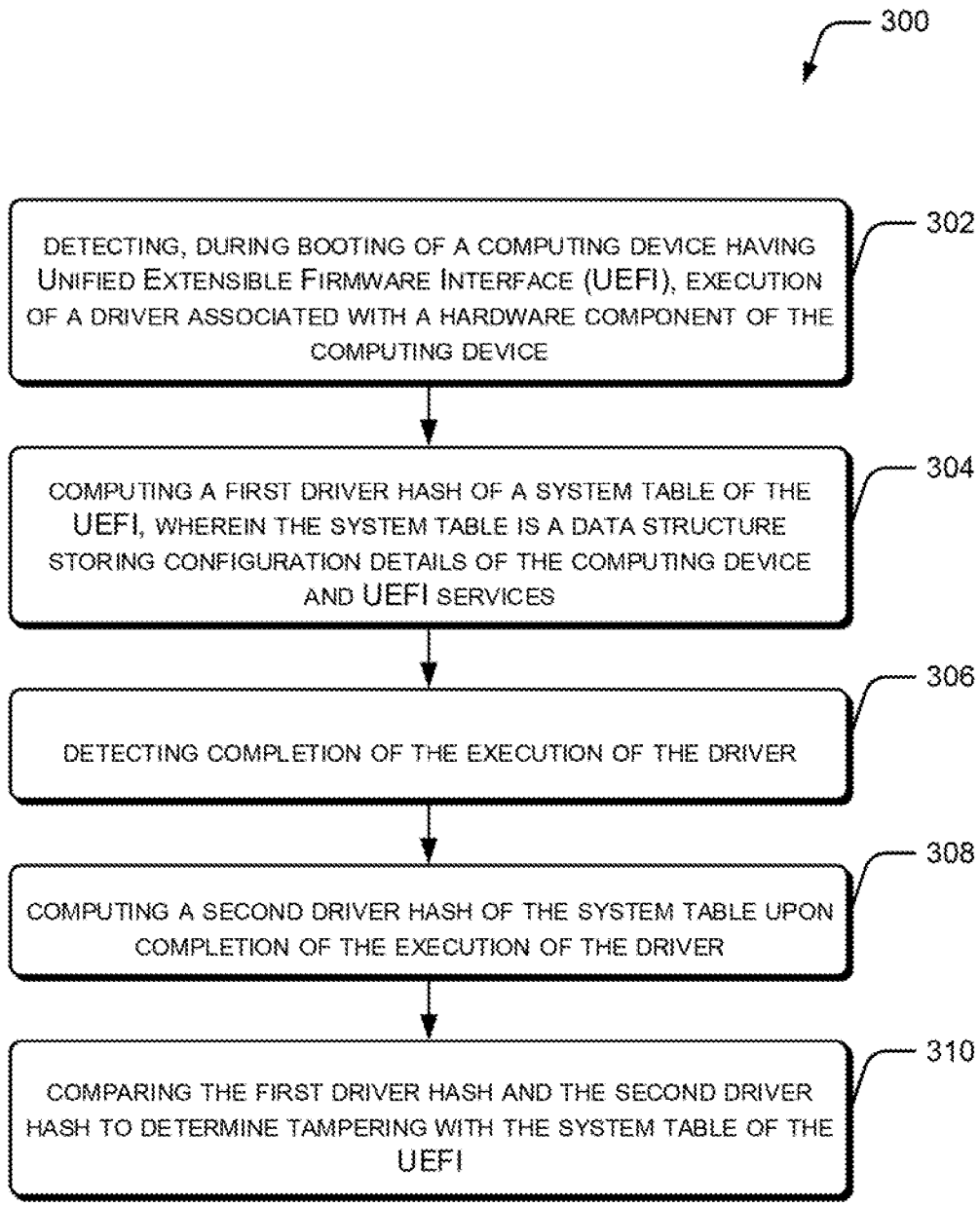
FIG. 3 illustrates a method for determining tampering with the UEFI, in accordance with an example of the present subject matter.

FIG. 3 illustrates a method 300 for determining tampering with the UEFI in a computing device, in accordance with an example of the present subject matter. Although the method 300 may be implemented in a variety of systems, but for the ease of explanation, the description of the method 300 is provided in reference to the above-described computing device 100. The order in which the method 300 is described is not intended to be construed as a limitation, and any number of the described method blocks may be combined in any order to implement the method 300, or an alternative method.

It may be understood that blocks of the method 300 may be performed in the computing device 100. The blocks of the methods 300 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 302, execution of driver associated with a hardware component of the computing device may be detected during booting of a computing device having Unified Extensible Firmware Interface (UEFI). The driver may be one of a Driver Execution Environment (DXE)

driver and a UEFI driver. In an example, the execution of the driver may be detected by a detection engine 102 of the computing device 100.

At block 304, a first driver hash of a system table of the UEFI is computed, where the system table is a data structure that stores configuration details of the computing device and UEFI services. In an example, a hashing engine 104 of the computing device 100 may compute the first driver hash of the system table.

At block 306, completion of the execution of the driver may be detected. In an example, the detection engine 102 may detect the completion of the execution of the driver.

At block 308, based on the detection of the completion of the execution of the driver, a second driver hash of the system table may be computed. In an example, the second driver hash may be computed by the hashing engine 104.

At block 310, the first driver hash and the second driver hash may be compared to determine tampering with the system table of the UEFI. In an example, the determination engine 106 may determine the tampering with the system table of the UEFI. If it is determined that the system table of the UEFI has been tampered with, a video output device coupled to the computing device 100 may be identified and a notification providing the details of the driver may be displayed on the video output device. Otherwise, the method may proceed to loading of an operating system on the computing device.

Figure 4:
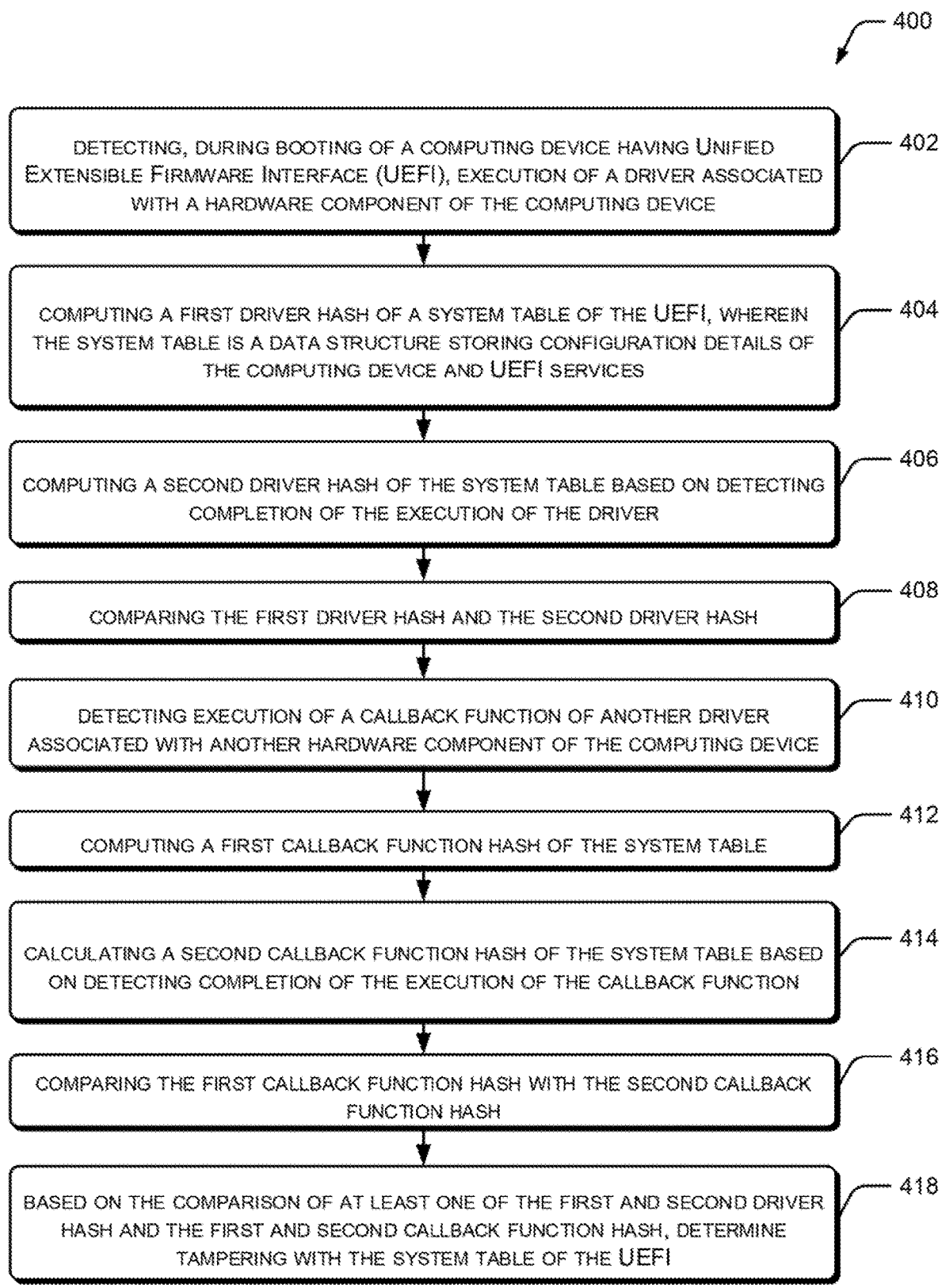
FIG. 4 illustrates a method for secure boot-up of the UEFI compliant computing device, in accordance with an example of the present subject matter.

FIG. 4 illustrates a method 400 for secure boot up of a UEFI compliant computing device, in accordance with an example of the present subject matter. Although the method 400 may be implemented in a variety of systems, but for the ease of explanation, the description of the method 400 is provided in reference to the above-described computing device 100. The order in which the method 400 is described is not intended to be construed as a limitation, and any number of the described method blocks may be combined in any order to implement the method 400, or an alternative method.

It may be understood that blocks of the method 400 may be performed in the computing device 100. The blocks of the methods 400 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 402, execution of a driver associated with a hardware component of the computing device may be detected in a driver execution phase (DXE) phase during booting of a computing device having Unified Extensible Firmware Interface (UEFI). The driver may be one of a Driver Execution Environment (DXE) driver and a UEFI driver. Based on the detection of the driver associated with the hardware, a system management interrupt (SMI) may be generated, thereby triggering a system management mode (SMM) within the DXE phase. The triggering of the SMM may preserve a state of a processor of the computing device in a secure region of the RAM designated as System Management RAM (SMRAM). In an example, the execution of the driver may be detected by a detection engine 102 of the computing device 100.

At block 404, a first driver hash of a system table of the UEFI is computed, where the system table is a data structure that stores configuration details of the computing device and various UEFI services. The various UEFI services may include UEFI boot services, UEFI runtime services, and protocol services. The first driver hash may be stored in the secure region of the RAM. Subsequently, the SMM may be terminated. In an example, the first driver hash of the system table of the UEFI may be computed by a hashing engine 104 of the computing device 100.

At block 406, completion of the execution of the second driver hash of the system table is detected. Based on the detection, the SMI is regenerated, thereby retriggering the SMM. Thereafter, a second driver hash of the system table is computed and stored in the SMRAM. In an example, the second driver hash may be computed by the hashing engine 104.

At block 408, the first driver hash and the second driver hash of the system table may be fetched from the SMRAM and compared with each other. A result of the comparison may then be stored in the SMRAM followed by termination of the SMM. In an example, the first driver hash and the second driver hash may be compared by a determination engine 106 of the computing device 100.

Subsequently, at block 410, execution of a callback function of another driver associated with another hardware component of the computing device may be detected. In an example, the detection of the execution of the callback function may be detected by the detection engine 102.

At block 412, based on the detection, the SMM mode may be retriggered within the DXE phase. A first callback function hash of the system table may then be computed and stored in the SMRAM, followed by termination of the SMM. The callback function may then be executed.

At block 414, completion of execution of the callback function may be detected. Based on the detection, the SMM may be retriggered and a second callback function hash may be computed. The second callback function may then be saved in the SMRAM. In an example, the second callback function hash may be computed by the hashing engine 104.

At block 416, the first callback function hash may be compared with the second callback function hash. A result of the above-mentioned comparison may then be stored in the SMRAM. In an example, the determination engine 106 may compare the first callback function hash with the second callback function hash.

At block 418, based on the result of comparison of at least one of the first and second driver hash and the first and second callback function hash, it may be ascertained if there has been a tampering with the system table of the UEFI. In an example, the determination engine 106 may determine the tampering with the system table of the UEFI.

In an example, if the first driver hash and the second driver hash aren't found to be equal, it may be determined that the execution of the driver lead to the tampering of the system table. Accordingly, the driver may be blocked. In said example, if the first callback function hash and the second callback function hash aren't found to be equal, it may further be determined that the execution of the callback function also led to the tampering of the system table. Accordingly, the callback function may also be blocked. In such a situation, the execution of the driver and the callback function of the other driver may be blocked during subsequent boots of the computing device 100.

Figure 5:
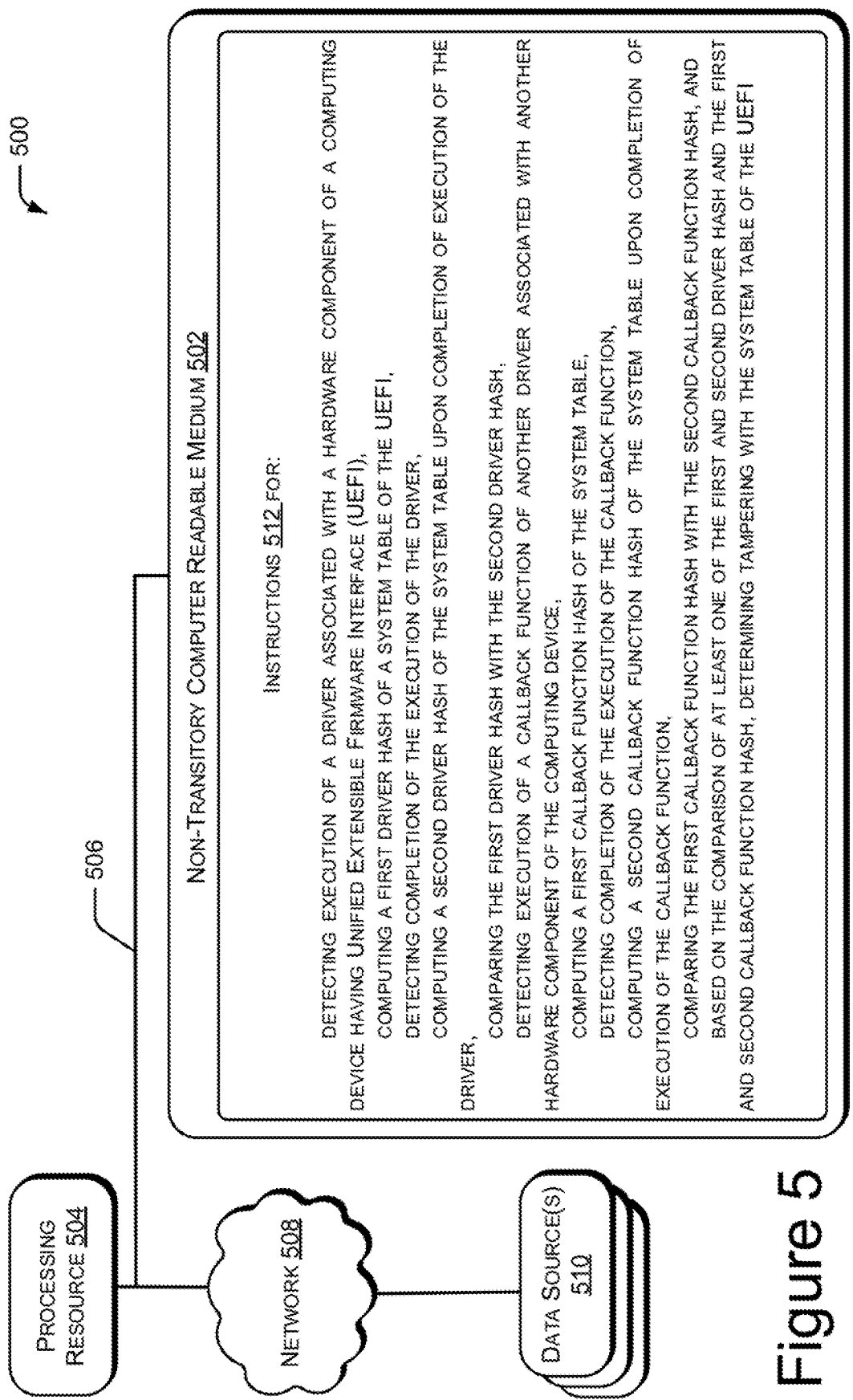
FIG. 5 illustrates a system environment implementing a non-transitory computer-readable medium for determining tampering with the UEFI in the computing device, in accordance with an example of the present subject matter.

FIG. 5 illustrates a system environment 500 implementing a non-transitory computer-readable medium 502 for determining tampering with UEFI in a computing device, in accordance with an example of the present subject matter. In an example implementation, the system environment 500 may be a computing device, such as the computing device 100. The system environment 500 includes a processing resource 504 communicatively coupled to the non-transitory computer-readable medium 502 through a communication link 506. In an example, the processing resource 504 fetches and executes computer-readable instructions from the non-transitory computer-readable medium 502.

The non-transitory computer-readable medium 502 can be, for example, an internal memory device or an external memory device. In an example implementation, the communication link 506 may be a direct communication link, such as any memory read/write interface. In another example implementation, the communication link 506 may be an indirect communication link, such as a network interface. In such a case, the processing resource 504 can access the non-transitory computer-readable medium 502 through a network 508. The network 508 may be a single network or a combination of multiple networks and may use a variety of different communication protocols.

The processing resource 504 and the non-transitory computer-readable medium 502 may also be communicatively coupled to data source(s) 510. The data source(s) 510 may be used to store data. In an example implementation, the non-transitory computer-readable medium 502 includes a set of computer-readable instructions for determining tampering with the UEFI in a computing device, such as the computing device 100. The set of computer-readable instructions can be accessed by the processing resource 504 through the communication link 506 and subsequently executed to authorize the access to the computing device 100.

In an example, the non-transitory computer-readable medium 502 may include instructions for implementing a detection engine 102. The instructions implementing the detection engine 102, in one example, may be a code executable to detect execution of drivers associated with hardware components of the component device 100. The code may further facilitate detection of completion of the execution of the drivers.

The non-transitory computer-readable medium 502 may further include a set of instructions implementing a hashing engine 104. The instructions implementing the hashing engine 104, in one example, may be a code executable to compute hash of a system table of the UEFI at various instances, where the system table is a data structure that stores configuration details of the computing device and UEFI services.

Moreover, the non-transitory computer-readable medium 502 may include a set of instructions implementing a determination engine 106. The instructions implementing the determination engine 106, in one example, may be a code executable to compare the hashes computed by the hashing engine 104 to determine tampering with the system table of the UEFI.

In an example of the present subject matter, the instructions implementing the detection engine 102 may detect execution of a driver associated with a hardware component of the computing device in a driver execution environment (DXE) phase during pre-operating system (OS) initialization of the computing device.

Based on the detection of execution of the driver, the instructions implementing the hashing engine 104 may compute a first driver hash of the system table.

The instructions implementing the detection engine 102 may then detect the completion of execution of the driver. Based on the detection, the instructions implementing the hashing engine 104 may compute a second driver hash of the system table. Thereafter, the instructions implementing the determination engine 106 may compare the first driver hash and the second driver hash and may store a result of comparison in the data source(s) 510.

Subsequently, the instructions implementing the detection engine 102 may detect execution of a callback function of another driver associated with another component of the computing device. Based on the detection, the instructions implementing the hashing engine 104 may compute a first callback function hash of the system table.

The instructions implementing the detection engine 102 may then detect the completion of execution of the callback function. Based on the detection, the instructions implementing the hashing engine 104 may compute a second callback function hash. Thereafter, the instructions implementing the determination engine 106 may compare the first callback function hash and the second callback function hash and store a result of comparison in the data source(s) 510.

Based on the comparison of at least one of the first and second driver hash and the first and second callback function hash, the instructions implementing the determination engine 106 may determine tampering with the system table of the UEFI. If it is determined that either the first and second driver hash do not match or the first and second callback function hash do not match, the instructions implementing the determination engine 106 may determine that the system table has been tampered.

In such a situation, the instructions implementing the determination engine 106 may block the at least one of the driver and the callback function of the other driver.

Blocking the least one of the driver and the callback function of the other driver may avoid execution of the malicious code during a subsequent boot of the computing device 100, thereby ensuring integrity of the UEFI of the computing device 100.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method comprising:
   detecting, during booting of a computing device having Unified Extensible Firmware Interface (UEFI), execution of a driver associated with a hardware component of the computing device;
   computing a first driver hash of a system table of the UEFI, wherein the system table is a data structure storing configuration details of the computing device and UEFI services;
   detecting completion of the execution of the driver;
   computing a second driver hash of the system table upon completion of the execution of the driver; and
   comparing the first driver hash and the second driver hash to determine tampering with the system table of the UEFI.

2. The method as claimed in claim 1, further comprising blocking the driver based on determining tampering with the system table of the UEFI.

3. The method as claimed in claim 2, further comprising blocking the execution of the driver during a subsequent boot of the computing device.

4. The method as claimed in claim 1, further comprising:
   identifying a video output device coupled to the computing device; and displaying a notification providing details of the driver on the video output device on determining the tampering with the system table.

5. The method as claimed in claim 1, further comprising undoing modifications made to the system table by the driver.

6. The method as claimed in claim 1, wherein the execution of the driver is detected within a driver execution environment (DXE) phase during the booting of the computing device.

7. The method as claimed in claim 6, wherein the driver is one of a DXE driver and a UEFI driver.

8. The method as claimed in claim 6, further comprising:
triggering a system management mode (SMM) within the DXE phase, wherein triggering the SMM preserves a state of a processor of the computing device in a secure region of a Random Access Memory (RAM) coupled thereto; and
storing the first driver hash and the second driver hash in the secure region of the RAM.

9. The method as claimed in claim 1, further comprising:
detecting execution of a callback function of another driver associated with another hardware component of the computing device;
computing a first callback function hash of the system table;
detecting completion of the execution of the callback function;
calculating a second callback function hash of the system table upon detection of completion of the callback function;
comparing the first callback function hash with the second callback function hash; and
based on the comparing, determining the tampering with the system table of the UEFI.

10. The method as claimed in claim 9, further comprising blocking the execution of the callback function during a subsequent boot of the computing device.

11. A system comprising:
a detection engine to detect, in a driver execution environment (DXE) phase during pre-operating system (OS) initialization of a computing device having Unified Extensible Firmware Interface (UEFI), execution of a callback function of a driver associated with a hardware component of the computing device;
a hashing engine coupled to the detection engine to:
compute a first callback function hash of a system table of the UEFI, wherein the system table is a data structure storing configuration details of the computing device and UEFI services;
compute a second callback function hash of the system table on detecting completion of the execution of the callback function; and
a determination engine coupled to the hashing engine to:
ascertain if the first callback function hash is different from the second callback function hash to determine tampering with the system table of the UEFI.

12. The system as claimed in claim 11, wherein the detection engine is coupled to a DXE dispatcher, wherein the DXE dispatcher discovers and executes a plurality of drivers associated with a plurality of hardware components of the computing device during the pre-OS initialization of the computing device.

13. The system as claimed in claim 11, further comprising a modification engine to undo modifications made to the system table based on the determination of the tampering with the system table of the UEFI.

14. A non-transitory computer-readable medium comprising instructions executable by a processing resource to:
detect execution of a driver associated with a hardware component of a computing device having Unified Extensible Firmware Interface (UEFI) in a driver execution environment (DXE) phase during pre-operating system (OS) initialization of the computing device;
compute a first driver hash of a system table of the UEFI, wherein the system table is a data structure storing configuration details of the computing device and UEFI services;
detect completion of the execution of the driver;
compute a second driver hash of the system table upon completion of the execution of the driver;
compare the first driver hash with the second driver hash;
detect execution of a callback function of another driver associated with another hardware component of the computing device in the DXE phase during the pre-OS initialization of the computing device;
compute a first callback function hash of the system table;
detect completion of the execution of the callback function;
compute a second callback function hash of the system table upon completion of the execution of the callback function;
compare the first callback function hash with the second callback function hash; and
based on the comparison of at least one of the first and second driver hash and the first and second callback function hash, determine tampering with the system table of the UEFI.

15. The non-transitory computer-readable medium as claimed in claim 14, further comprising instructions to block the execution of at least one of the driver and the callback function of the other driver during a subsequent boot of the computing device.

* * * * *